(12) United States Patent
Sahouani (10) Patent No.: US 7,582,330 B2
(45) Date of Patent: *Sep. 1, 2009

(54) METHOD FOR MAKING METALLIC NANOSTRUCTURES

(75) Inventor: Hassan Sahouani, Hastings, MN (US)

(73) Assignee: 3M Innovative Properties Counsel, St. Paul, MN (US)

( * ) Notice: Subject to any disclaimer, the term of this patent is extended or adjusted under 35 U.S.C. 154(b) by 835 days.

This patent is subject to a terminal disclaimer.

(21) Appl. No.: 10/996,833

(22) Filed: Nov. 24, 2004

(65) Prior Publication Data

US 2006/0110528 A1    May 25, 2006

(51) Int. Cl.
*B05D 1/22* (2006.01)
*B05D 3/02* (2006.01)

(52) U.S. Cl. .................... 427/180; 427/372.2; 427/437; 524/100; 977/777

(58) Field of Classification Search ................. 427/180, 427/372.2, 737, 437; 524/100
See application file for complete search history.

(56) References Cited

U.S. PATENT DOCUMENTS

| | | | |
|---|---|---|---|
| 4,882,166 A | 11/1989 | Graham et al. |
| 5,948,487 A | 9/1999 | Sahouani et al. |
| 6,051,290 A | 4/2000 | Sahouani et al. |
| 6,214,499 B1 | 4/2001 | Helber et al. |
| 6,245,399 B1 | 6/2001 | Sahouani et al. |
| 6,248,364 B1 | 6/2001 | Sengupta et al. |
| 6,355,386 B1 | 3/2002 | Helber et al. |
| 6,395,354 B1 | 5/2002 | Sahouani et al. |
| 6,411,354 B1 | 6/2002 | Lavrentovich et al. |
| 6,488,866 B1 | 12/2002 | Sahouani et al. |
| 6,527,977 B2 | 3/2003 | Helber et al. |
| 6,538,714 B1 | 3/2003 | Sahouani et al. |
| 6,562,363 B1 | 5/2003 | Mantelle et al. |
| 6,570,632 B2 | 5/2003 | Lavrentovich et al. |
| 6,574,044 B1 | 6/2003 | Sahouani et al. |
| 6,576,712 B2 | 6/2003 | Feldstein et al. |
| 6,645,578 B2 | 11/2003 | Sahouani et al. |
| 6,673,398 B2 | 1/2004 | Schneider et al. |
| 6,696,077 B2 | 2/2004 | Scherr |
| 6,699,533 B2 | 3/2004 | Sahouani et al. |
| 6,777,036 B2 | 8/2004 | Bravo Vasquez et al. |
| 6,962,734 B2 | 11/2005 | Nazarov et al. |
| 7,247,723 B2 * | 7/2007 | Sahouani ..................... 544/198 |
| 2002/0066885 A1 | 6/2002 | Sahouani et al. |

(Continued)

FOREIGN PATENT DOCUMENTS

EP   1 232 414 B1   8/2002

(Continued)

OTHER PUBLICATIONS

Huang et al., "Nanowirre Arrays Electrodeposited from Liquid Crystalline Phases", Advanced Materials, (Jan. 4, 2002), pp. 61-64, vol. 14, No. 1, Wiley-VCH Verlag GmbH, D-69469 Weinheim.

(Continued)

*Primary Examiner*—Shamim Ahmed
(74) *Attorney, Agent, or Firm*—Harold C. Knecht, III (57) ABSTRACT

A method of making metallic nanostructures by mixing (a) an aqueous composition comprising a chromonic material with (b) a metal salt in solution or a suspension of metal particles.

20 Claims, 4 Drawing Sheets

U.S. PATENT DOCUMENTS

| | | | |
|---|---|---|---|
| 2002/0132065 A1 | 9/2002 | Sahouani et al. | |
| 2002/0168511 A1 | 11/2002 | Schneider et al. | |
| 2003/0008145 A1 | 1/2003 | Goldstein | |
| 2003/0047711 A1* | 3/2003 | Kawata et al. | 252/299.01 |
| 2004/0058091 A1 | 3/2004 | Dutova et al. | |
| 2006/0110540 A1 | 5/2006 | Sahouani | |
| 2006/0110922 A1 | 5/2006 | Sahouani | |
| 2006/0111482 A1 | 5/2006 | Sahouani | |
| 2007/0086964 A1 | 4/2007 | Moran et al. | |
| 2007/0086965 A1 | 4/2007 | Mohanty et al. | |
| 2007/0128291 A1 | 6/2007 | Tokie et al. | |
| 2007/0140957 A1 | 6/2007 | Mohanty et al. | |
| 2007/0141351 A1 | 6/2007 | Mohanty et al. | |
| 2007/0148458 A1 | 6/2007 | Sahouani et al. | |

FOREIGN PATENT DOCUMENTS

| | | |
|---|---|---|
| KR | 10-2003-0010846 | 2/2003 |
| WO | WO 98/37997 A2 | 9/1998 |
| WO | WO 00/22463 A1 | 4/2000 |
| WO | WO 2004/033488 A2 | 4/2004 |
| WO | WO2005/011629 | 2/2005 |
| WO | WO 2005/021488 A2 | 2/2005 |

OTHER PUBLICATIONS

Fang et al., "Aggregation and Surface-Enhanced Raman Activity Study of Dye-Coated Mixed Silver-Gold Colloids", Journal of Raman Spectroscopy, (2004), pp. 914-920, vol. 35, No. 11, John Wiley & Sons, Ltd.

Stenzel et al., "The Incorporation of Metal Clusters Into Thin Organic Dye Layers as a Method for Producing Strongly Absorbing Composite Layers: An Oscillator Model Approach to Resonant Metal Cluster Absorption", Journal of Physics D: Applied Physics, (1995), pp. 2154-2162, vol. 28, No. 10, IOP Publishing, Ltd.

Barbic et al., "Single Crystal Silver Nanowires Prepared by the Metal Amplification Method", Journal of Applied Physics, (Jun. 1, 2002), pp. 9341-9345, vol. 91, No. 11, 2002 American Institute of Physics.

Kawasaki et al., "Controlled Layering of Two-Dimensional J-Aggregate of Anionic Cyanine Dye on Self-Assembled Cysteamine Monolayer on Au(111)", Langmuir, (2000), pp. 5409-5417, vol. 16, No. 12, 2000 American Chemical Society.

Pardavi-Horvath et al., "Iron-Alumina Nanocomposites Prepared by Ball Milling", IEEE Transactions on Magnetics, (Sep. 1992), pp. 3186-3188, vol. 28, No. 5.

Lydon, "Chromonic Mesophases", Current Opinion in Colloid and Interface Science, (2004), pp. 480-490, vol. 8.

Ding et al., "Structure Analysis of Nanowires and Nanobelts by Transmission Electron Microscopy", J. Phys. Chem. B, (2004), pp. 12280-12291, vol. 108, No. 33.

Attwood et al., "Lyotropic Mesophase Formation by Anti-Asthmatic Drugs", Mol. Cryst. Liq. Cryst., (1984), pp. 349-357, vol. 108, Gordon and Breach, Science Publishers, Inc.

Brinker et al., "Review of Sol-Gel Thin Film Formation", Journal of Non-Crystalline Solids, (1992), pp. 424-436, vol. 147&148, Elsevier Science Publishers B. V.

Lydon, "Chapter XVIII, Chromonics", Handbook of Liquid Crystals, (1998), pp. 981-1007, vol. 2 B: Low Molecular Weight Liquid Crystals II, Wiley-VCH Verlag GmbH. D-60469 Weinheim.

Aguirre et al., "CTAB Mediated Reshaping of Metallodielectric Nanoparticles", Nano Letters, (2003), pp. 1707-1711, vol. 3, No. 12, American Chemical Society.

Medintz et al., "Self-Assembled Nanoscale Biosensors Based on Quantum Dot FRET Donors", Nature Materials, (Sep. 2003), pp. 630-638, vol. 2, Nature Publishing Group.

Kumar et al., "Linear Superclusters of Colloidal Gold Particles by Electrostatic Assembly on DNA Templates", Advanced Materials, (Mar. 2, 2001), pp. 341-344, vol. 13, No. 5, Wiley-VCH Verlag GmbH, D-69469 Weinheim.

Hong et al., "Ultrathin Single-Crystalline Silver Nanowire Arrays Formed in an Ambient Solution Phase", Science, (Oct. 12, 2001), pp. 348-351, vol. 294.

Zhang et al., "Polymer Microgels: Reactors for Semiconductor, Metal, and Magnetic Nanoparticles", JACS, (2004), 7908-7914, vol. 126, No. 25, American Chemical Society.

Hurley, L. H. et al., "G-quadruplexes as Targets for Drug Design", *Pharmacol Ther.*, (Mar. 2000), vol. 83, No. 3,pp. 141-158.

Kostko, A. F. et al., "Salt Effects on the Phase Behavior, Structure, and Rheology of Chromonic Liquid Crystals", *J. Phys. Chem* ., (Oct. 20, 2005), vol. 109, No. 41, pp. 19126-19133.

* cited by examiner

METHOD FOR MAKING METALLIC NANOSTRUCTURES

FIELD

This invention relates to methods for making metallic nanostructures using chromonic materials and, in another aspect, to articles comprising a chromonic matrix and metal nanostructures.

BACKGROUND

In recent years, there has been increasing research effort to develop metal structures in the nanoscale range (that is, in the 0.1 to 100 nm range) for a variety of technological applications such as, for example, electronic and optical devices, labeling of biological material, magnetic recording media, and quantum computing.

Numerous approaches have been developed for synthesizing/fabricating metal nanostructures such as, for example, metal nanowires, nanorods, nanotubes, and nanoribbons. Current approaches include, for example, fabricating metal nanowires by the electroless deposition of metal into the pores of nanoporous membranes by a metal amplification process (see, for example, Barbic et al., J. Appl. Phys., 91, 9341 (2002)) and fabricating metal nanowires/nanotubes by a vapor-liquid-solid (VLS) process in which involves the dissolution of gaseous reactants in nanosized liquid droplets of the metal solvent, followed by nucleation and growth of single crystalline wires (see, for example, Ding et al., J. Phys. Chem. B 108, 12280 (2004)). A challenge that remains, however, is controlling the size and shape of metallic nanostructures, as well as their orientation and distribution, particularly on a large scale.

SUMMARY

In view of the foregoing, it has been recognized that there is a need for a method for making nanostructures that provides control over the size and shape of metallic nanostructures, as well as their orientation and distribution, over a relatively large area.

Briefly, in one aspect, the present invention provides a method of making metallic nanostructures. The method comprises mixing (a) an aqueous composition comprising a chromonic material with (b) a metal salt in solution or a suspension of metal particles.

As used herein, "chromonic materials" (or "chromonic compounds") refers to large, multi-ring molecules typically characterized by the presence of a hydrophobic core surrounded by various hydrophilic groups (see, for example, Attwood, T. K., and Lydon, J. E., Molec. Crystals Liq. Crystals, 108, 349 (1984)). The hydrophobic core can contain aromatic and/or non-aromatic rings. When in solution, these chromonic materials tend to aggregate into a nematic ordering characterized by a long-range order.

The present invention also provides a method of making metallic nanostructures comprising (a) applying an aqueous composition comprising a chromonic material to the surface of a substrate; and (b) placing the coated surface in contact with a solution comprising a metal salt.

The methods of the invention enable the fabrication of metallic nanostructures with relatively uniform size and shape. The methods further enable relatively uniform distribution and long-range orientation or order of metallic nanostructures over a relatively large area.

Thus, the methods of the invention meet the need in the art for an improved method for making metallic nanostructures.

In another aspect, the present invention provides articles comprising a chromonic matrix and metal nanostructures. As used herein, "chromonic matrix" refers to chromonic materials that are aggregated into a nematic ordering.

DETAILED DESCRIPTION

Any chromonic material can be useful in the methods of the invention. Compounds that form chromonic phases are known in the art, and include, for example, xanthoses (for example, azo dyes and cyanine dyes) and perylenes (see, for example, Kawasaki et al., Langmuir 16, 5409 (2000), or Lydon, J., Colloid and Interface Science, 8, 480 (2004)). Representative examples of useful chromonic materials include di- and mono-palladium organyls, sulfamoyl-substituted copper phthalocyanines, and hexaaryltryphenylene.

Preferred chromonic materials include those represented by one of the following general structures:

wherein
each $R^2$ is independently selected from the group consisting of electron donating groups, electron withdrawing groups, and electron neutral groups, and
$R^3$ is selected from the group consisting of substituted and unsubstituted heteroaromatic rings and substituted and unsubstituted heterocyclic rings, the rings being linked to the triazine group through a nitrogen atom within the ring of $R^3$.

As depicted above, the chromonic compound is neutral, but it can exist in alternative forms such as a zwitterion or proton tautomer (for example, where a hydrogen atom is dissociated from one of the carboxyl groups and is associated with one of the nitrogen atoms in the triazine ring). The chromonic compound can also be a salt such as, for example, a carboxylate salt.

The general structures above show orientations in which the carboxyl group is para with respect to the amino linkage to the triazine backbone of the compound (formula I) and in which the carboxy group is meta with respect to the amino linkage to the triazine backbone (formula II). The carboxy group can also be a combination of para and meta orientations (not shown). Preferably, the orientation is para.

Preferably, each $R^2$ is hydrogen or a substituted or unsubstituted alkyl group. More preferably, $R^2$ is independently selected from the group consisting of hydrogen, unsubstituted alkyl groups, alkyl groups substituted with a hydroxy or halide functional group, and alkyl groups comprising an ether, ester, or sulfonyl. Most preferably, $R^2$ is hydrogen.

$R^3$ can be, but is not limited to, heteroaromatic rings derived from pyridine, pyridazine, pyrimidine, pyrazine, imidazole, oxazole, isoxazole thiazole, oxadiazole, thiadiazole, pyrazole, triazole, triazine, quinoline, and isoquinoline. Preferably, $R^3$ comprises a heteroaromatic ring derived from pyridine or imidazole. A substituent for the heteroaromatic ring $R^3$ can be selected from, but is not limited to, the group consisting of substituted and unsubstituted alkyl, carboxy, amino, alkoxy, thio, cyano, amide, sulfonyl, hydroxy, halide, perfluoroalkyl, aryl, ether, and ester. Preferably, the substituent for $R^3$ is selected from the group consisting of alkyl, sulfonyl, carboxy, halide, perfluoroalkyl, aryl, ether, and alkyl substituted with hydroxy, sulfonyl, carboxy, halide, perfluoroalkyl, aryl, or ether. When $R^3$ is a substituted pyridine, the substituent is preferably located at the 4-position. When $R^3$ is a substituted imidazole, the substituent is preferably located at the 3-position.

Representative examples of $R^3$ include 4-(dimethylamino)pyridinium-1-yl, 3-methylimidazolium-1-yl, 4-(pyrrolidin-1-yl)pyridinium-1-yl, 4-isopropylpyridinium-1-yl, 4-[(2-hydroxyethyl)methylamino]pyridinium-1-yl, 4-(3-hydroxypropyl)pyridinium-1-yl, 4-methylpyridinium-1-yl, quinolinium-1-yl, 4-tert-butylpyridinium-1-yl, and 4-(2-sulfoethyl)pyridinium-1-yl, shown below.

$R^3$ can also be represented by the following general structure:

wherein $R^4$ is hydrogen or a substituted or unsubstituted alkyl group. More preferably, $R^4$ is selected from the group consisting of hydrogen, unsubstituted alkyl groups, and alkyl groups substituted with a hydroxy, ether, ester, sulfonate, or halide functional group. Most preferably $R^4$ is selected from the group consisting of propyl sulfonic acid, methyl, and oleyl.

$R^3$ can also be selected from heterocyclic rings such as, for example, morpholine, pyrrolidine, piperidine, and piperazine.

A preferred chromonic compound for use in the methods of the invention can be represented by one of the following structures:

(III)

-continued (IV)

wherein $X^-$ is a counterion. Preferably, $X^-$ is selected from the group consisting of $HSO_4^-$, $Cl^-$, $CH_3COO^-$, and $CF_3COO^-$.

Formula III depicts the compound in its zwitterionic form. The pyridine nitrogen therefore carries a positive charge and one of the carboxy functional groups carries a negative charge ($COO^-$).

The compound can also exist in other tautomeric forms such as where both carboxy functional groups carry a negative charge and where positive charges are carried by one of the nitrogens in the triazine groups and the nitrogen on the pyridine group.

As described in U.S. Pat. No. 5,948,487 (Sahouani et al.), which is herein incorporated by reference in its entirety, triazine derivatives with formula I can be prepared as aqueous solutions. A typical synthetic route for the triazine molecules shown in formula I above involves a two-step process. Cyanuric chloride is treated with 4-aminobenzoic acid to give 4-{[4-(4-carboxyanilino)-6-chloro-1,3,5-triazin-2-yl]amino}benzoic acid. This intermediate is treated with a substituted or unsubstituted nitrogen-containing heterocycle. The nitrogen atom of the heterocycle displaces the chlorine atom on the triazine to form the corresponding chloride salt. The zwitterionic derivative, such as that shown in formula III above, is prepared by dissolving the chloride salt in ammonium hydroxide and passing it down an anion exchange column to replace the chloride with hydroxide, followed by solvent removal. Alternative structures, such as that shown in formula II above, may be obtained by using 3-aminobenzoic acid instead of 4-aminobenzoic acid.

Chromonic materials are capable of forming a chromonic phase or assembly when dissolved in an aqueous solution (preferably, an alkaline aqueous solution). Chromonic phases or assemblies are well known in the art (see, for example, Handbook of Liquid Crystals, Volume 2B, Chapter XVIII, Chromonics, John Lydon, pp. 981-1007, 1998) and consist of stacks of flat, multi-ring aromatic molecules. The molecules consist of a hydrophobic core surrounded by hydrophilic groups. The stacking can take on a number of morphologies, but is typically characterized by a tendency to form columns created by a stack of layers. Ordered stacks of molecules are formed that grow with increasing concentration.

Preferably, the chromonic material is placed in aqueous solution in the presence of one or more pH-adjusting compounds and a surfactant. The addition of pH-adjusting compounds allows the chromonic material to become more soluble in aqueous solution. Suitable pH-adjusting compounds include any known base such as, for example, ammonium hydroxide or various amines. Surfactant can be added to the aqueous solution to promote wetting of the solution onto the surface of a substrate. Suitable surfactants include ionic and non-ionic surfactants (preferably, non-ionic). Optional additives such as viscosity modifiers (for example, polyethylene glycol) and/or binders (for example, low molecular weight hydrolyzed starches) can also be added.

Typically, the chromonic materials are dissolved in the aqueous solution at a temperature less than about 40° C. (more typically, at room temperature). One skilled in the art will recognize, however, that the geometry and size of the resulting metallic nanostructures can be controlled to some extent by varying the temperature.

The relative concentrations of each of the components in the aqueous solution will vary with the desired orientation of the resulting nanostructures and their intended application. Generally, however, the chromonic material will be added to the solution to achieve a concentration in the range of about 4 to about 20 (preferably, about 4 to about 8) percent by weight of the solution.

The aqueous composition comprising a chromonic material can be mixed with a suspension of metal particles. Typically, the concentration of metal particles in the resulting mixture will be in the range of about 1 to about 35 percent by weight of the total solids.

Preferred metal particles include noble metal particles. More preferred metal particles include silver particles, gold particles, platinum particles, and mixtures and alloys thereof. Non-noble metal particles such as, for example, particles comprising iron can also be used.

Preferably, the metal particles are surface modified, for example, with alkyl thiols, alkyl glycol thiols, alkyl amines, or glycol amines.

The resulting mixture can be applied to the surface of a substrate. Suitable substrates include any solid materials that will accept the application of the mixture (for example, glass or polymeric films).

The mixture can be applied by any useful means that provides for the ordered arrangement of the chromonic materials such as, for example, by coating techniques such as wire-wound coating rod or extrusion die methods. Preferably, shear orientation or magnetic orientation is applied to the mixture either during or after application. The application of shear or magnetic force to the mixture can help promote alignment of the chromonic materials such that, upon drying, an oriented structure or matrix is obtained.

Drying of the coated layer can be achieved using any means suitable for drying aqueous coatings. Useful drying methods will not damage the coating or significantly disrupt the orientation of the coated layer imparted during coating or application.

After drying, the chromonic material can be removed such that only metallic nanostructures remain on the substrate. The chromonic material can be removed using any means such as, for example by heating to decomposition (for example, by heating to higher than about 300° C.). Alternatively, if the substrate is glass, the chromonic material can be removed with a basic solution.

Alternatively, the aqueous composition comprising a chromonic material can be mixed with a metal salt in solution. Preferred metal salts include noble metal salts. More preferred metal salts include silver salts (for example, silver nitrate, silver acetate, and the like), gold salts (for example, gold sodium thiomalate, gold chloride, and the like), platinum salts (for example, platinum nitrate, platinum chloride, and the like), and mixtures thereof. Most preferred metal salts include, silver nitrate, silver acetate, gold sodium thiomalate, gold chloride, and mixtures thereof.

Generally, the metal salt will be present in the resulting mixture at a concentration of less than about 50 percent by weight of the mixture.

The resulting mixture can be applied to the surface of a substrate (preferably, with the application of shear orientation or magnetic orientation during after the application) as described above.

The metal salt can be reduced via reduction methods known in the art either before or after applying the mixture to the surface of a substrate. For example, the reduction can be accomplished by using a reducing agent (for example, tris (dimethylamino)borane, sodium borohydride, potassium borohydride, or ammonium borohydride), electron beam (e-beam) processing, or ultraviolet (UV) light.

After the metal salt is reduced, the coated layer can be dried and the chromonic material can be removed such that only metallic nanostructures remain on the substrate as described above.

The aqueous composition comprising a chromonic material can also be applied to the surface of a substrate (preferably, with the application of shear orientation or magnetic orientation during after the application) before mixing with a metal salt in solution. After the aqueous composition comprising a chromonic material is applied to the surface of a substrate, it can be placed in contact with (for example, immersed in) a solution comprising a metal salt. Preferred metal salts are the same as those preferred above. The metal salt can then be reduced, and the chromonic material can optionally be removed as described above.

The methods described can be used to make nanostructures such as, for example, nanowires and regular arrays of nanostructures (that is, arrays in which relatively uniformly sized and shaped nanostructures (for example, spherical nanoparticles) are substantially evenly spaced). The methods of the invention can facilitate the fabrication of nanostructures over large areas, which can be advantageous, for example, for applications such as electro-magnetic interference (EMI) filters.

EXAMPLES

Objects and advantages of this invention are further illustrated by the following examples, but the particular materials and amounts thereof recited in these examples, as well as other conditions and details, should not be construed to unduly limit this invention.

Unless otherwise noted, all reagents and compounds were or can be obtained from Aldrich Chemical Co., Milwaukee, Wis.

As used herein, "purified water" refers to water available under the trade designation "OMNISOLVE" from EMD Chemicals, Inc., Gibbstown, N.J.; "APG 325" refers to a 70 weight percent aqueous solution of an alkyl polyglucoside, a surfactant available from Cognis Corp. USA, Cincinnati, Ohio; and "ICB 3003" refers to a starch obtained from A.E. Staley Manufacturing Co., Decatur, Ill.

Example 1

Preparation of Silver Nanoparticles in a Chromonics Assembly

A mixture of purified water (4.0 g), ethylene diamine (0.09 g), the chromonic compound of Formula III (1.0 g), glucose (0.3 g), and APG 325 (0.01 g) was magnetically stirred in a flask for approximately 15 minutes. A separate mixture of purified water (4.0 g), poly(acrylic acid) (0.16 g of a 25 weight percent aqueous solution of 90,000 molecular weight poly(acrylic acid)), ammonium hydroxide (0.42 g of a 30 weight percent aqueous solution), and silver nitrate (0.03 g) was magnetically stirred for approximately 15 minutes. The two mixtures were combined in a flask by stirring them together for 15 minutes to provide a mixture for coating. This mixture was coated onto a glass microscope slide using a #3 wound wire coating rod. The coating was then exposed to tris(dimethylamino)borane vapor by placing the coated glass slide in a sealed glass jar for 2 minutes. After the slide was removed from the jar, the coating was allowed to dry in air at room temperature for at least 5 minutes.

Example 2

Preparation of Silver Nanoparticles in a Chromonics Assembly

A mixture of purified water (4.0 g), the chromonic compound of Formula III 1.0 g), APG 325 (0.1 g of a 10 weight percent aqueous solution), and ammonium hydroxide (0.3 g of a 30 weight percent aqueous solution) was magnetically stirred in a flask for approximately 15 minutes. A separate mixture of purified water (4.0 g), ammonium hydroxide (11.0 g of a 30 weight percent aqueous solution), and silver oxide (0.2 g) was magnetically stirred in a flask for approximately 15 minutes. The two mixtures were combined in a flask by stirring them together for 15 minutes to provide a mixture for coating. This mixture was coated onto a glass microscope slide using a #3 wound wire coating rod. The coating was then exposed to tris(dimethylamino)borane vapor by placing the coated glass slide in a sealed glass jar for 2 minutes. After the slide was removed from the jar, the coating was allowed to dry in air at room temperature for at least 5 minutes.

Example 3

Preparation of Silver Nanowires in a Chromonics Assembly

Figure 1:
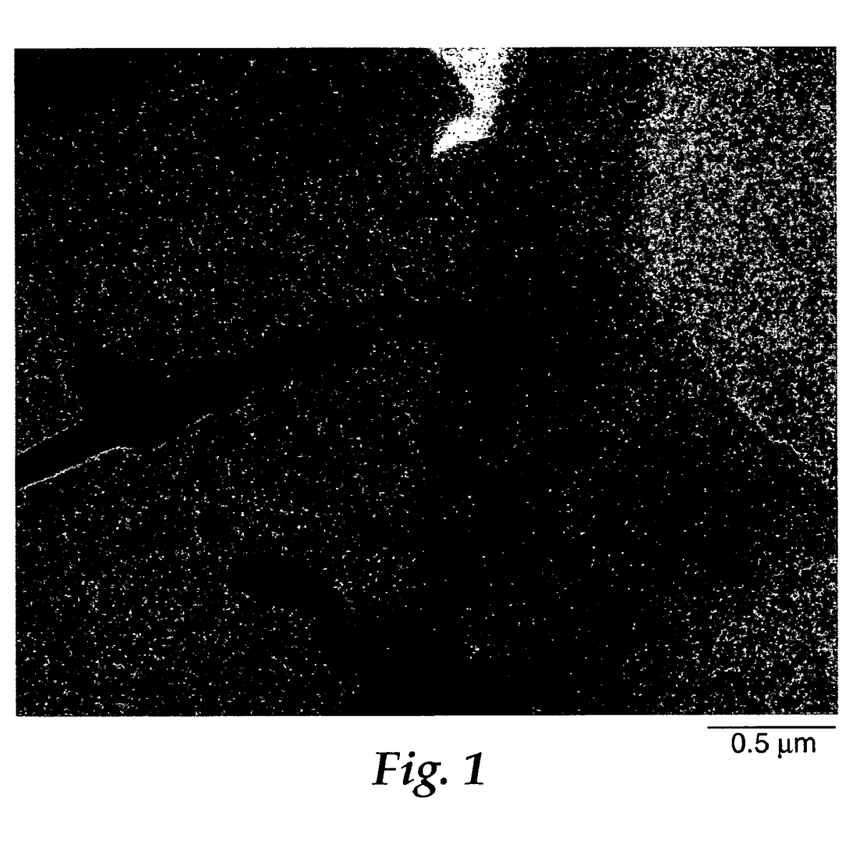
FIG. 1 is a transmission electron micrograph showing a top view of a coating comprising silver nanowires.
Figure 2:
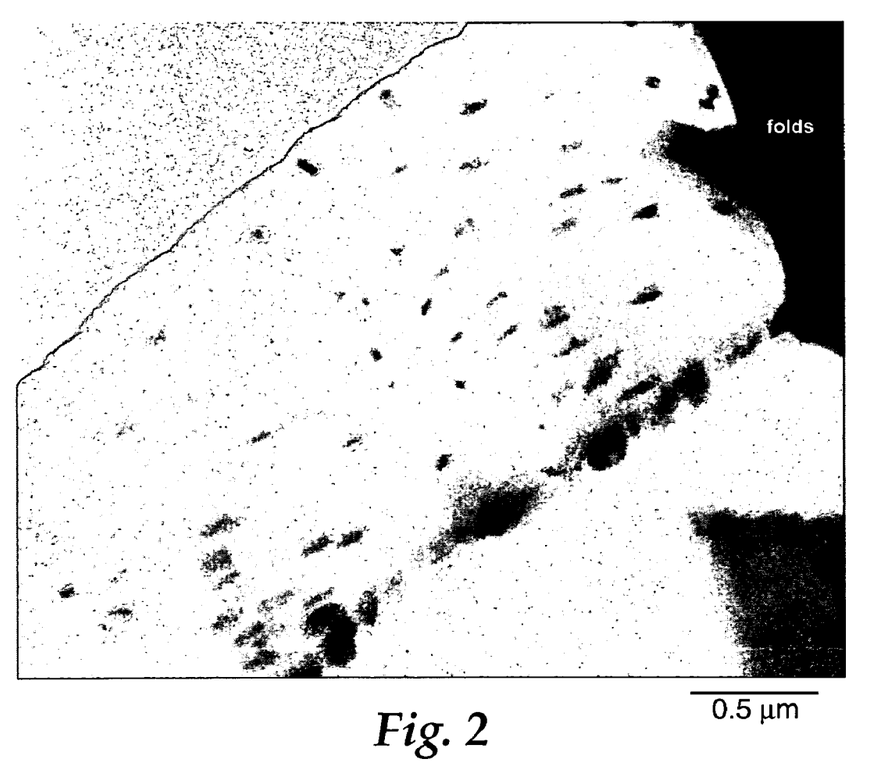
FIG. 2 is a transmission electron micrograph showing an edge view of a coating comprising silver nanowires.

A mixture of purified water (8.0 g), ammonium hydroxide (1.3 g of a 30 weight percent aqueous solution), the chromonic compound of Formula III (11.0 g), APG 325 (0.01 g), and silver benzoate (0.2 g) was magnetically stirred for approximately 20 minutes in a flask. This mixture was coated onto a glass microscope slide using a #5 wound wire coating rod. The coating was then exposed to tris(dimethylamino) borane vapor by placing the coated glass slide in a sealed glass jar for 2 minutes. After the slide was removed from the jar, the coating was allowed to dry in air at room temperature for at least 5 minutes. The coating was then examined by transmission electron microscopy using a Model H9000 electron microscope (available from Hitachi High Technologies America, Inc., Pleasanton, Calif.) operating at 300 kV. Transmission electron micrographs of the silver nanowires are shown in FIGS. 1 and 2. FIG. 1 is a top view of the coating (showing the lengths of the nanowires) in which the silver nanowires are the dark features. FIG. 2 is an edge view of the coating (showing the ends of the nanowires) in which the silver nanowires are the dark features.

Example 4

Preparation of Silver Nanowires in a Chromonics Assembly

A mixture of purified water (8.0 g), lithium hydroxide (0.08 g), the chromonic compound of Formula III (1.0 g), APG 325 (0.3 g of a 10 weight percent aqueous solution), M200 hydrolyzed starch (0.03 g, available from Grain Processing Corp., Muscatine, Iowa), silver nitrate (0.21 g), and ammonium hydroxide (0.075 g of a 30 weight percent aqueous solution) was magnetically stirred for approximately 30 minutes in a flask. This mixture was coated onto a glass microscope slide using a #3 wound wire coating rod, after which a 10 weight percent solution of potassium borohydride in ethanol was carefully applied via pipette to the surface of the coating. After approximately 5 minutes, the glass slide was rinsed with ethanol and was allowed to dry in air at room temperature.

Example 5

Preparation of Gold Nanoparticles in a Chromonics Assembly

Figure 3:
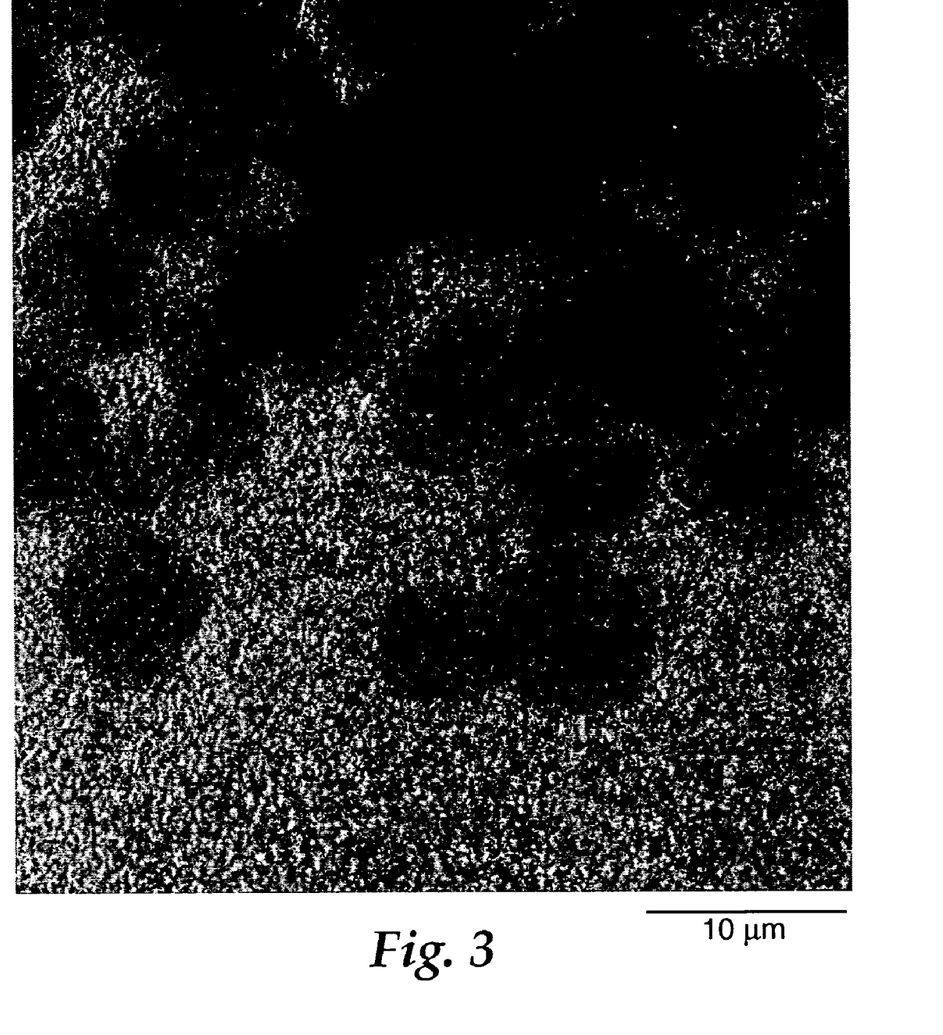
FIG. 3 is a transmission electron micrograph showing gold nanoparticles.

A mixture of purified water (9.0 g), ammonium hydroxide (0.25 g of a 30 weight percent aqueous solution), APG 325 (3 drops of a 10 weight percent aqueous solution) and the chromonic compound of Formula III (11.0 g) was magnetically stirred in a flask for approximately 15 minutes. To this mixture there was added gold sodium thiomalate (0.1 g). The mixture was stirred for an additional 15 minutes and was then coated onto a glass microscope slide using a #5 wound wire coating rod. The coating was then exposed to tris(dimethylamino)borane vapor by placing the coated glass slide in a sealed glass jar for 2 minutes. After the slide was removed from the jar, the coating was allowed to dry in air at room temperature for at least 5 minutes. The coating was dissolved by immersing and then agitating the coated glass slide in purified water. A small sample of the resultant suspension of gold nanoparticles was analyzed by dynamic light scattering using a Model ZEN3600 particle size analyzer (available from Malvern Instruments, Southborough, Mass.) and was found to have a mean particle size of approximately 5 nanometers. The small sample was further analyzed by transmission electron microscopy using a Model H9000 electron microscope (available from Hitachi High Technologies America, Inc., Pleasanton, Calif.) operating at 300 kV, which showed gold nanoparticles (as dark features) that were substantially spherical. The transmission electron micrograph is shown in FIG. 3.

Example 6

Preparation of Silver Nanowires

Figure 4:
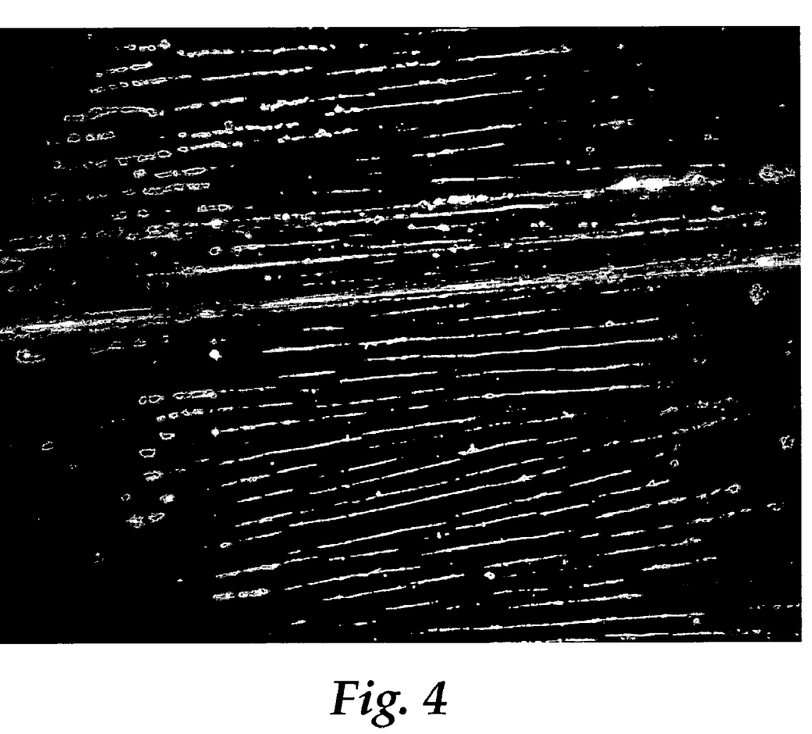
FIG. 4 is an optical micrograph showing silver nanowires.

A mixture of purified water (9.0 g), ammonium hydroxide (0.25 g of a 30 weight percent aqueous solution), APG 325 (0.01 g), ICB 3003 (0.3 g), and the chromonic compound of Formula III (1.0 g) was magnetically stirred for approximately 15 minutes. The mixture was coated onto a glass microscope slide using a #3 wound wire coating rod. The coating was allowed to dry for approximately 30 minutes in air at room temperature and then the coated glass slide was immersed in a 40 weight percent aqueous solution of silver perchlorate for approximately 2 minutes. The coated glass slide was then rinsed with ethanol and was then immersed in a 3 weight percent solution of potassium borohydride in ethanol for approximately 1 minute. The coated glass slide was then rinsed sequentially with ethanol and 10 weight percent aqueous ammonium hydroxide solution. Rinsing with the aqueous ammonium hydroxide solution removed the chromonics assembly. The glass slide was then allowed to dry in air at room temperature for approximately 5 minutes, after which time it was examined by optical microscopy using a Model DM4000 M microscope (available from Leica Microsystems, Inc., Bannockburn, Ill.) at 1000 power. An optical micrograph of the silver nanowires is shown in FIG. 4. In FIG. 4, the silver nanowires are visible as the light features.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of making metallic nanostructures comprising mixing (a) an aqueous composition comprising a chromonic material with (b) a metal salt dissolved in solution, and reducing said metal salt so as to form a metallic nanostructure.

2. The method of claim 1 wherein said chromonic material is selected from the group consisting of compounds represented by one of the following general structures:

wherein
each $R^2$ is independently selected from the group consisting of electron donating groups, electron withdrawing groups, and electron neutral groups, and
$R^3$ is selected from the group consisting of substituted and unsubstituted heteroaromatic rings and substituted and unsubstituted heterocyclic rings, said rings being linked to the triazine group through a nitrogen atom within the ring of $R^3$,
and zwitterions, proton tautomers, and salts thereof.

3. The method of claim 2 wherein each said $R^2$ is independently selected the group consisting of hydrogen, unsubstituted alkyl groups, alkyl groups substituted with a hydroxyor halide functional group, and alkyl groups comprising an ether, ester, or sulfonyl.

4. The method of claim 2 wherein said $R^3$ comprises a heteroaromatic ring derived from the group consisting of pyridine, pyridazine, pyrimidine, pyrazine, imidazole, oxazole, isoxazole, thiazole, oxadiazole, thiadiazole, pyrazole, triazole, triazine, quinoline, and isoquinoline.

5. The method of claim 4 wherein said $R^3$ comprises a heteroaromatic ring derived from pyridine or imidazole.

6. The method of claim 5 wherein said $R^3$ is selected from the group consisting of pyridinium-1-yl, 4-(dimethylamino) pyridinium-1-yl, 3-methylimidazolium-1-yl, 4-(pyrrolidin-1-yl)pyridinium-1-yl, 4-isopropylpyridinium-1-yl, 4-[(2-hydroxyethyl)methylamino]pyridinium-1-yl, 4-(3- hydroxypropyl)pyridinium-1-yl, 4-methylpyridinium-1-yl, quinolinium-1-yl, 4-tert-butylpyridinium-1-yl, and 3-(2-sulfoethyl)pyridinium-1-yl.

7. The method of claim 2 wherein said chromonic material is represented by the following general structure:

and zwitterions, proton tautomers, and salts thereof.

8. The method of claim 7 wherein said chromonic material is represented by one of the following structures:

wherein X⁻ is a counterion.

9. The method of claim 8 wherein said X⁻ is selected from the group of counterions consisting of $HSO_4^-$, $Cl^-$, $CH_3COO^-$, and $CF_3COO^-$.

10. The method of claim 1 further comprising applying the mixture to the surface of a substrate.

11. The method of claim 10 further comprising applying shear orientation or magnetic orientation during or after application of said mixture.

12. The method of claim 10 further comprising removing said chromonic material such that said metallic nanostructure remains.

13. The method of claim 1 wherein said metal salt is a noble metal salt.

14. A method of making metallic nanostructures comprising (a) applying an aqueous composition comprising a chromonic material to the surface of a substrate; and (b) placing the coated surface in contact with a solution comprising a dissolved metal salt.

15. The method of claim 14 further comprising applying shear orientation or magnetic orientation during or after application of said aqueous composition comprising a chromonic material, and reducing said metal salt so as to form a metallic nanostructure.

16. The method of claim 14 further comprising reducing said metal salt so as to form a metallic nanostructure.

17. The method of claim 16 further comprising removing said chromonic material such that said metallic nanostructure remains.

18. The method of claim 1 further comprising removing said chromonic material such that said metallic nanostructure remains.

19. The method of claim 11 further comprising removing said chromonic material such that said metallic nanostructure remains.

20. The method of claim 15 further comprising removing said chromonic material such that said metallic nanostructure remains.

* * * * *

UNITED STATES PATENT AND TRADEMARK OFFICE
CERTIFICATE OF CORRECTION

| | | |
|---|---|---|
| PATENT NO. | : 7,582,330 B2 | Page 1 of 1 |
| APPLICATION NO. | : 10/996833 | |
| DATED | : September 1, 2009 | |
| INVENTOR(S) | : Hassan Sahouani | |

It is certified that error appears in the above-identified patent and that said Letters Patent is hereby corrected as shown below:

Title Page, Column 2
Under "Other Publications," line 1, delete ""Nanowirre" and insert -- "Nanowire --, therefor.

Title Page 2, Column 1
Under "Foreign Patent Documents," line 6, delete "2005/021488" and insert
-- 2005/012488 --, therefor.

Column 2
Line 22, delete "xanthoses" and insert -- xanthosis --, therefor.

Column 8
Line 20, delete "1.0 g)," and insert -- (1.0 g), --, therefor.
Line 24, delete "(11.0" and insert -- (1.0 --, therefor.
Line 42, delete "(11.0" and insert -- (1.0 --, therefor.

Column 9
Line 22, delete "(11.0" and insert -- (1.0 --, therefor.

Column 10
Line 52, claim 3, delete "the" and insert -- from the --, therefor.
Line 53, claim 3, delete "hydroxyor" and insert -- hydroxy or --, therefor.

Signed and Sealed this

Fifth Day of January, 2010

David J. Kappos
*Director of the United States Patent and Trademark Office*